United States Patent [19] [11] 4,340,973
Umetsu [45] Jul. 20, 1982

[54] SELECTIVE CALLING RECEIVER INCLUDING A VOLTAGE CONVERTER WITH LOW POWER CONSUMPTION

[75] Inventor: Shinjiro Umetsu, Tokyo, Japan

[73] Assignee: Nippon Electric Co., Ltd., Tokyo, Japan

[21] Appl. No.: 190,924

[22] Filed: Sep. 26, 1980

[30] Foreign Application Priority Data

Sep. 29, 1979 [JP] Japan .......................... 54-134803[U]

[51] Int. Cl.³ ............................................. H04B 1/16
[52] U.S. Cl. .................................... 455/228; 455/343
[58] Field of Search ...................... 455/31, 343, 35, 38, 455/228; 179/2 EC; 340/825.44, 311.1, 311

[56] References Cited

U.S. PATENT DOCUMENTS 3,769,593 10/1973 Williams .............................. 340/311
3,774,114 11/1973 Dahlgren .............................. 455/38
4,181,893  1/1980 Ehmke ................................. 340/311
4,194,153  3/1980 Masaki ................................ 455/343

FOREIGN PATENT DOCUMENTS 54-119819 9/1979 Japan ..................................... 455/343

Primary Examiner—Jin F. Ng
Attorney, Agent, or Firm—Laff, Whitesel, Conte & Saret

[57] ABSTRACT

A selective calling receiver has a receiver section for receiving and demodulating radio signals. A decoder section, which is connected to the receiver section, operates with first and second levels of power consumption for selectively receiving the demodulated signals and controlling the receiving operation. A voltage converter section is switched off responsive to a signal from the decoder section when the circuit is operational at the first level of power consumption. The voltage converter section is intermittently switched on and off when the circuit is operating, which requires the second level of power consumption. A timer is activating within a predetermined period after the power is switched to the second level.

5 Claims, 25 Drawing Figures

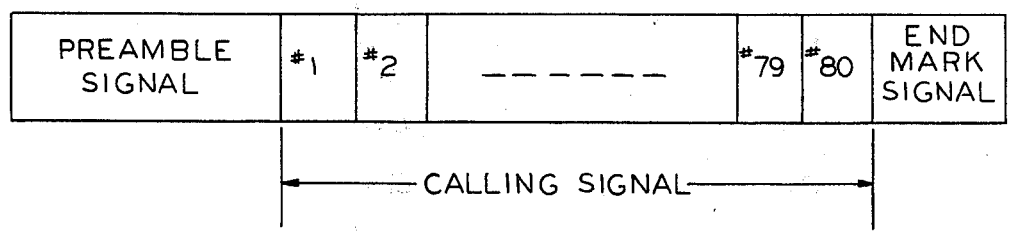
FIG.2
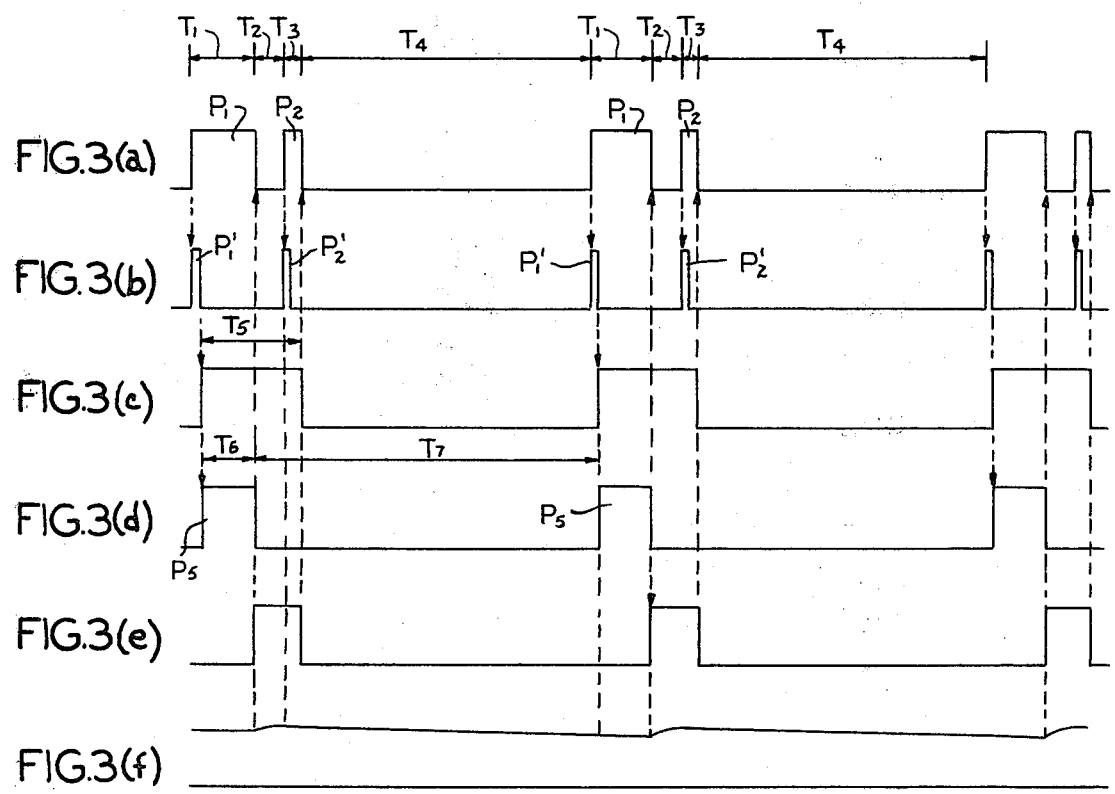

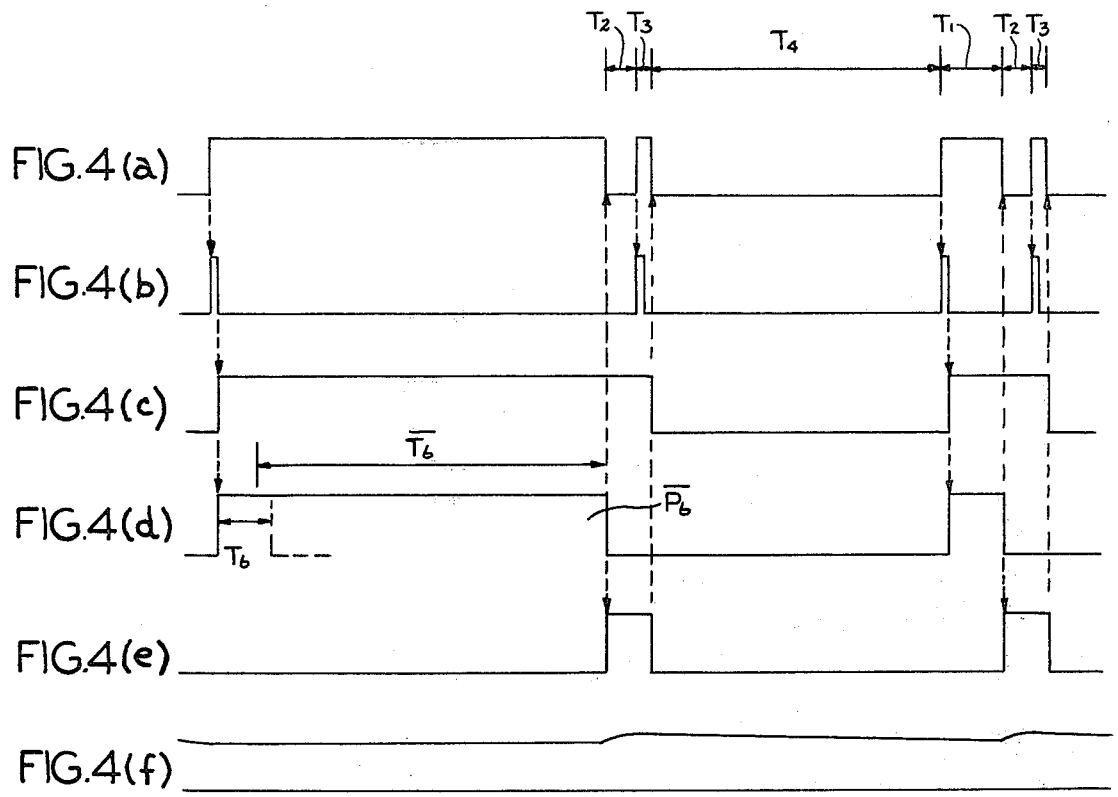
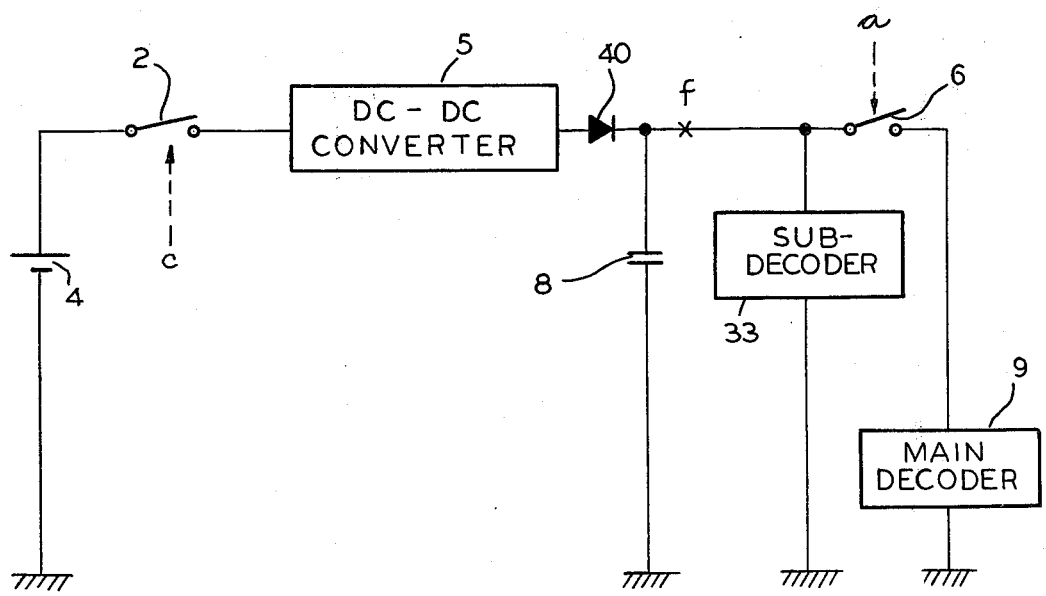
FIG.5

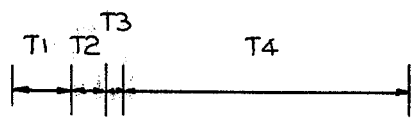
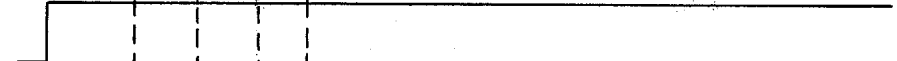

SELECTIVE CALLING RECEIVER INCLUDING A VOLTAGE CONVERTER WITH LOW POWER CONSUMPTION

The present invention concerns a selective calling receiver using a voltage converter (hereinafter called "receiver").

The recent trend in the mobile communications is that the amount of transmitted information is ever increasing. The devices are provided with multiple functions, which in turn requires a higher speed at the decoder section where the receiving operation is controlled or where the selective receiving operation is performed. The decoder is often comprised of CMOS (Complementary Metal Oxide Silicon) devices to reduce the power consumption. On the other hand, since the maximum operating speed of CMOS devices depends on the power source voltage and the receiver section operates at 1 volt, it is conceivable that an independent and exclusive power source (of about 5 volts) may be used for the decoder. Or, the voltage for the receiver section could be raised by a voltage (for example, DC-DC) converter. Such an exclusive power source is, however, undesirable since the size of the receiver becomes larger and it requires an extra maintenance step of exchanging batteries.

The use of a DC-DC converter increases the power consumption within the "converter", thereby increasing the power consumption of the whole receiver. Prior art references concerning this type of selective calling receiver are found in the Japanese Patent Application Disclosure No. 72501/77 and the U.S. Pat. No. 3,882,466.

An object of the present invention is to provide a selective calling receiver wherein the decoder section stops an operation of the voltage converter at any time when the power consumption is low, thereby minimizing the power consumption in the voltage converter and realizing the power saving.

According to the present invention, a selective calling receiver has a receiver section for receiving and demodulating radio signals. A decoder section is connected to the receiver section and is operative with either a first power consumption or a second power consumption which is larger than the first power consumption. The decoder section selectively receives the demodulated signals and controls the receiving operation. A voltage converter section converts the output of a power source to supply power to the decoder section. The voltage converter section is made non-operating in response to a signal from the decoder section when operating at the first power consumption level. The voltage converter section is intermittently operated when the decoder is operating at the second power consumption level. A timer activates the decoder section to switch to the first or lower power level after the power switching means is turned on. Between the voltage converting section and the decoder section, a suitable filter smooths the output from the voltage converting section.

The above-mentioned and other features of the present invention will become more apparent by referring to the following description taken in conjunction with the accompanying drawings, wherein:

FIG. 2 shows one example of a composition of a transmission signal;

Figure 1:
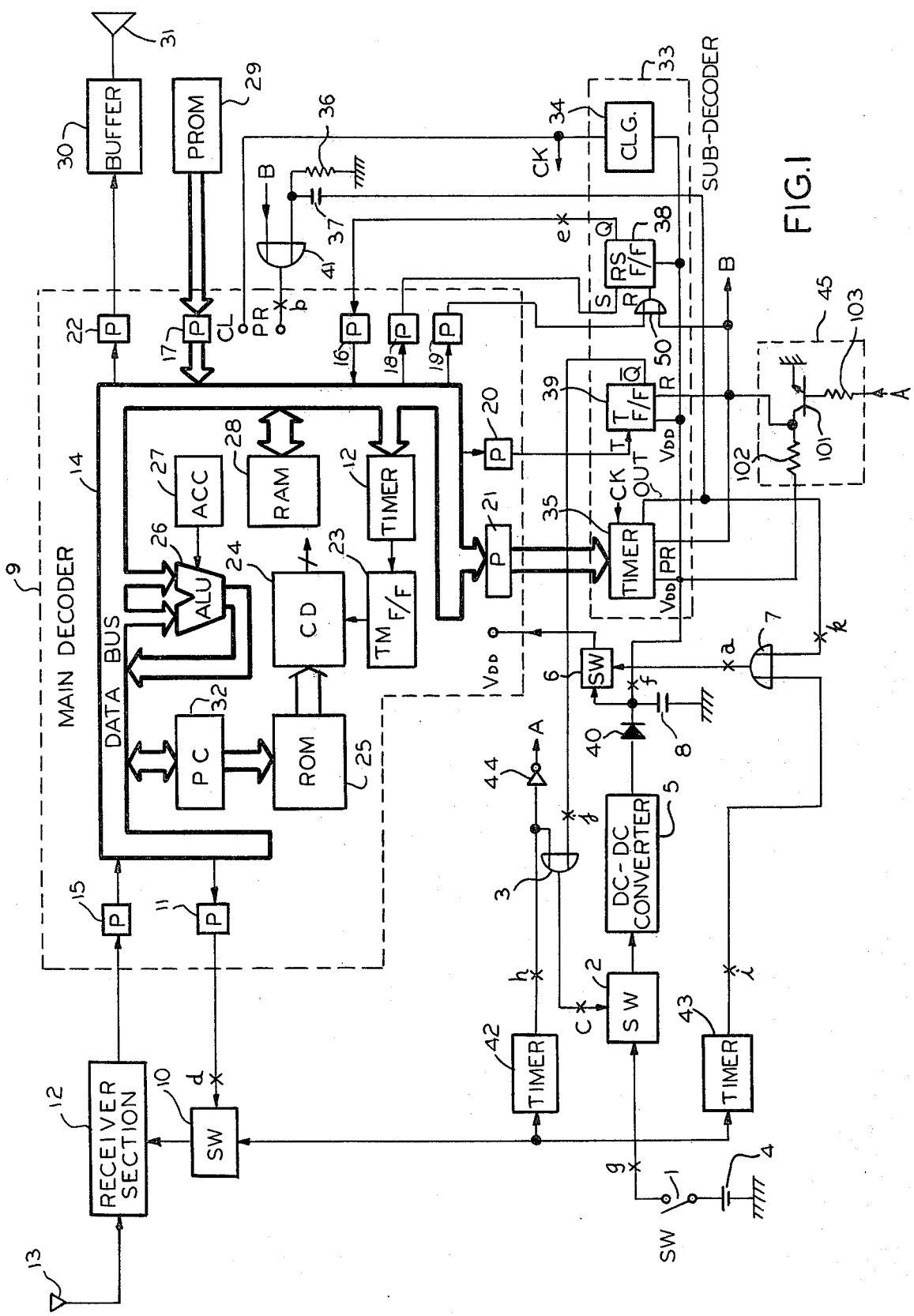
FIG. 1 is an embodiment of a selective calling receiver in accordance with the present invention.

FIGS. 3(a) to 3(f) are the waveforms of signals appearing at the respective points a to f of FIG. 1 during the battery saving operation;

FIGS. 4(a) to 4(f) show waveforms of signals appearing at the respective points a to f of FIG. 1 when preamble signals are received;

FIG. 5 shows an example of a circuit for a simplified power source for the decoder of FIG. 1; and FIGS. 6(a) to 6(k) are the waveforms for signals appearing at the respective points a to k in FIG. 1 immediately after the power switch has been turned on.

The receiving operation of a selective calling receiver shown FIG. 1 will now be explained by referring to FIGS. 2 to 4. Switch (SW) 1 is a power switch for the whole receiver. A switch 2 turns on and off the power of a battery 4 to a DC-DC converter 5 in response to the output of an OR gate 3. The DC-DC converter 5 raises the voltage of the battery 4 to supply the necessary voltage (for example, about 5 volts) to a main decoder 9 and a sub-decoder 33. A switch 6 turns on and off the power to the main decoder 9 responsive to the output from an OR gate 7. A switch 10 is used to reduce the power consumption, as is generally known, by intermittently supplying the power of the battery 4 to a receiver section 12 in response to the signals from an output port 11. Switches 2, 6 and 10 are turned on and off intermittently. For briefly explaining how the radio signals are supplied to an antenna 13 and how calling signals are detected, we shall assume that only the switch 10 is turned on and off intermittently as shown in FIG. 3(d), while the rest of the switches are all kept turned on.

During the operating time T6 (FIG. 3(d)) of the receiver section 12, the main decoder 9 processes the received preamble signals of FIG. 2. The preamble signal includes several tens of unique words as disclosed in FIGS. 2(b) and 2(c) of the U.S. Pat. No. 4,194,153. When the switch 10 is turned on, the radio signal from the antenna 13 is amplified, frequency-converted, and demodulated to be supplied to the main decoder 9 (such as μCOM-43 SINGLE CHIP MICROCOMPUTER (μPD 546 or μPD 650) marketed by NEC).

A data bus 14 is signal line for data in the main decoder. Input ports 15, 16, and 17 are the interfaces for inputing the signals from the outside circuits respectively connected thereto to the data bus 14. The output ports 11, 18, 19, 20, 21 and 22 are the interfaces for feeding the signal from the data bus 14 to the outside circuits connected respectively thereto. A CD (controller and decoder) 24 transmits the control signals to each block according to the program stored in ROM (Read Only Memory) 25. The CD 24 also performs the operation of shifting the demodulation signal by one bit at the ALU (arithmetic and logic unit) 26, storing the data and comparing the stored data with the prescribed patterns. The read-out timing of the demodulation signal is controlled by the output of TM F/F (Timer Flip-Flop) 23 which is set by a timer 12.

When the switch 10 is turned on for the period T6 shown in FIG. 3(d), the preamble signal codes and the predetermined codes stored in ROM 25 are collated at ALU 26. If their codes coincide with each other, the period T6 is extended for the period $\overline{T6}$ (FIG. 4(d)) which is sufficient to receive the calling signals #1 to #80 as shown in FIG. 2.

The main decoder 9 starts the receiving of calling signal codes and reads the demodulation signal codes into the shift register bit by bit at ALU 26, as the preamble signal codes are being received. Decoder 9 compares the preamble signal with its own calling signal codes pre-written in PROM (Programable Read Only Memory) 29. If the preamble coincides with its own calling signal codes, the controller and decoder CD 24 provides an intermittent audible signal to the output port 22, under the control instructions programmed in ROM 25, and in response to the signal sent from the timer 12 through TM F/F 23. The intermittent audible signal is fed to a speaker 31 by way of a buffer 30, to provide an alert signal. If the preamble signal is not its own calling signal codes, the calling signal code of the next word received. Thus, if the receiver does not find its own calling signal code until the word 80 is received, an endmark signal (as shown in FIG. 2) is received to repeat the battery saving operation of FIG. 3(d) by intermittently turning on and off the switch 10. In the above operation, ACC (accumulator) 27 in the main decoder stores the operational results of ALU 26 temporarily. The PC (program counter) 32 is a counter designed to address the program written in ROM 25. The counter 32 is usually advanced by one step every time that an instruction is executed. The content of the counter 32 is renewed by the jump and subroutine instructions.

In the operation outlined above, the main decoder 9 processes signals during the operating time of the receiver section 12. The receiver need not operate when the receiver section 12 is not actuated. Thus, the receiver reduces the power consumption during such period by turning off the power source to the main decoder 9 by the switch 6, shown in FIG. 1, which is similar to the operation of the switch 10.

The power is constantly applied to the subdecoder 33. A CLG (clock generator) 34 generates the system clock pulses for the main decoder 9 and the clock pulses for a timer 35. The timer 35 is set by the signal from an output port 21 for the periods T2 and T4 (FIGS. 3(a) and 4(a) from the time the switch 6 switches OFF until the time when it switches ON. It is a programmable counter where the output OUT becomes low when activated, and high when time runs out.

This output OUT is connected to a preset terminal PR of the main decoder 9 through a differentiation circuit (comprising a capacitor 37 and a resistor 36) and an OR gate 41. The resultant signal is used as the preset signal (FIGS. 3(b) and 4(b) for initializing the main decoder 9 every time the switch 6 switches ON. The RS F/F 38 is an RS flip-flop which is set by the signal from the output port 18 and reset by the signal from the output port 19. The correspondance of the preset signals (FIG. 3(b) and pulse $P_1$ or $P_2$ (FIG. 3(a)) is determined by the output Q of RS F/F 38. As mentioned above, T1 is a period during which the receiving section 12 operates to process the demodulated signals, while T3 is a period during which the main decoder executes processing, to turn off the switch SW2, as will be mentioned hereunder.

The decoder comprising the main decoder 9 and the subdecoder 33 in FIG. 1 operates on two different modes of power consumption. According to the present invention, the operation of a DC-DC converter supplies the first and the second currents $I_1$ and $I_2$, ($I_1$ $I_2$) to the decoder. This converter is stopped when the decoder is on the first current. The aim is to reduce the average current of DC-DC converter.

Battery saving operation for DC-DC converter, according to the present invention, is now explained. FIG. 5 is a simplified circuit of the power systems for the decoder of FIG. 1.

We shall assume that RS F/F 38 and T F/F 39 are reset and set as shown in FIGS. 3(e) and 3(c), respectively, immediately before the trailing edge of the pulse $P_2$ shown in FIG. 3(a). The timer 35 is set to measure the time duration T4 between the trailing edge of pulse $P_2$ and the leading edge of $P_1$. At the trailing edge of pulse $P_2$, the timer 35 is activated. During the period T4, the switches (SW) 2 and 6 are turned off as shown in FIGS. 3(a) and 3(c), respectively. The output voltage from the DC-DC converter 5 is not available. However, power is supplied to the sub-decoder 33 by the charge of the capacitor 8, thereby gradually lowering the output voltage at the point f, as shown in FIG. 3(f). A diode 40 is for preventing the reverse current to DC-DC converter 5 from the capacitor 8, but it may be omitted if the equivalent impedance of the output of DC-DC converter 5, during the time when DC-DC converter is not operating, is very high as compared to the impedence of the subdecoder 33.

When the timer 35 indicates the end of the period T4, its output OUT becomes high as shown in FIG. 3(a). This high voltage supplies the power to the main decoder 9 via the OR gate 7, by turning on the switch 6, and also feeds the preset signal shown in FIG. 3(b) to the preset terminal PR of the main decoder 9 by way of the differentiation circuit.

The main decoder, thus preset, executes instructions from the starting address of the program sequentially. The main decoder 9 judges that a preset signal $P_1'$ corresponds to the pulse $P_1$ since the output Q of RS F/F 38 is a low level. The decoder starts receiving preamble signals.

In the preamble reception, the pulses from the port 20 are supplied to triggered F/F 39, first to change its output from low to high, thereby turning on the switch 2 as shown in FIG. 3(c) in order to cope with the increased current at the decoder 9 which occurs when switch 6 turns on, as shown in FIG. 3(a). As in FIG. 3(d), the switch 10 is turned on to begin the receiver section 12 operation, and to receive the preamble signals as mentioned above. The RS F/F 38 is set, as shown in FIGS. 3(e) and 4(e), before the trailing edge of a pulse $P_6$ of FIG. 3(d) or of a pulse $P_6$ in FIG. 4(d), in other words, when the receiving operation is completed. The switch 6 is turned off as shown in FIGS. 3(a) and 4(a).

The timer 35 is set to measure the time duration T2 between the trailing edge of $P_1$ and the leading edge of $P_2$, and it is activated in response to the trailing edge of $P_1$. During this period the switch 2 is turned on and the switch 6 is turned off, so that the load on DC-DC converter 5 becomes lighter and the potential at the point f rises. In other words, during the time when the switch 2 is turned off, the capacitor 8 which has been discharged is recharged. The time T2 is determined by operating and nonoperating currents at the decoder, the capacity of the capacitor 8 and the output impedance of the DC-DC converter 5.

When the timer 35 indicates the end of the period T2, the switch 6 is turned on, the main decoder 9 is preset, and the instructions are executed with the starting address of the program, as for the afore-mentioned period T4. As RS F/F 38 is set, as shown in FIG. 3(e), the preamble signal receiving operation is not carried out, and DC-DC converter 5 is stopped. That is, RS F/F 38 is reset and T F/F 39 is set ($\overline{Q}$=LOW) in order to turn off the switch 2 and to stop DC-DC converter 5. The period T4 is programmed on the timer 35. When activated, the output OUT of the timer 35 switches low, the switch 6 becomes OFF and the sub-decoder alone keeps operating. The above operation is then repeated.

The timing chart of FIGS. 4(a) to 4(f) will be readily understand from aforementioned description.

As has been described above, the DC-DC converter is operated and stopped in response to the difference in the current consumption or power consumption at the decoder. The DC-DC converter realizes the reduction in the mean power consumption, without destroying the memory stored at the volatile memory element such as flip/flops and counters included in the decoder, by means of the voltage smoothing circuit composed of the diode and the capacitor.

We shall next consider the instance where the switch 1 is turned from off to on. A timer 42 and a timer 43 are the timers which are activated when the switch 1 is closed, and are thereafter operable by the voltage of the battery 4. The timer 42 or 43 comprises either an integrating circuit (composed of a resistor R and a capacitor C) and a transistor switch activated by the voltage of the capacitor, or a constant current circuit, a capacitor connected to the constant current circuit and a transistor switch activated by the voltage of the capacitor. The time set as measured by such a timer is determined by either the time constant of the CR circuit and the base-emitter voltage $V_{BE}$ of the transistor switch, or the output current of the constant current circuit, the capacity of the capacitor and $V_{BE}$ of the transistor switch.

FIGS. 6(a) to 6(k) show the waveforms at points a to k of FIG. 1, after the switch 1 has been turned on. When the switch 1 is turned on, the voltage of the points g, h and i becomes high as shown in FIGS. 6(g), 6(h) and 6(i), and the switch 2 is turned on during the time period T8 set in a timer 42 as shown in FIG. 6(h) or 6(c). During the time period T8, the output of DC-DC converter 5 becomes sufficiently high, as shown in FIG. 6(f). The output from an inverter 44 connected to the timer 42 is low. The transistor 101 is an initial preset section 45 and then is turned off. The voltage at the collector of transistor 101 is pulled up to the voltage point f by a resistor 102. Accordingly, the collector voltage waveform for the transistor 101 is at the same potential as the points f and b of FIGS. 6(f) and 6(d). At the same time, the preset terminal PR of the main decoder 9, the preset terminal PR of the timer 35 and reset terminals of RS F/F 38 and T F/F 39 become high. The switch 6 is turned on by the output of the timer 43 applied through OR gate 7, as shown in FIG. 6(i) or 6(a) to feed power to the main decoder. The output OUT of the timer 35 is set at high, as shown in FIG. 6(k), and RS F/F 38 and T F/F 39 are reset as shown in FIGS. 6(e) and 6(j), respectively.

When the timer 42 reaches the predetermined time T8, as shown in FIG. 6(h), the transistor 101 is turned on, and the point f becomes low, to activate the main decoder 9 through the OR gate 41. In other words, the timer 42 acts to operate the DC-DC converter 5 for a predetermined period of time T8 and sets the various portions securely in the initial states after the output of DC-DC converter 5 reaches the voltage which enables an operation of the main decoder 9. The reference numeral 103 denotes a resistor. The timer 43 acts to keep the switch 6 on until the main decoder 9 is activated.

The time period T9 is longer than the time period T8. The operation in the main decoder 9, after activation, is the same as that which occurs during the steady state, with the switch 1 turned on.

As explained above, mutually different currents are consumed by the decoder, depending on its status. These currents are supplied by the power of the DC-DC converter. The power consumption in the DC-DC converter may be made zero and the mean power consumption may be reduced by using a diode for preventing a reverse current. A capacitor continuously supplies a DC voltage to the decoder. The operation of the DC-DC converter stops during the period while the decoder is consuming less current. Power is supplied to the decoder responsive to the charge of the capacitor, while maintaining the memory stored in the volatile memory elements such as flip-flops, counter, etc. in the decoder. When the power supply switch is turned from off to on, the output of the DC-DC converter has not yet risen, and the signal for controlling the operation of the DC-DC converter can not naturally be generated by the decoder. In order to solve this problem, the present invention provides a timer which operates immediately after the switch is turned on and continues until the output from the DC-DC converter has fully risen to enable the operation of the DC-DC converter.

According to the present invention, when the rise of the DC-DC converter is delayed, the output of the DC-DC converter, which is the power source voltage of the decoder, and the output of the timer may be used together as a means to give preset signals to the decoder in order to securely obtain the preset signal after the output from the DC-DC converter has risen sufficiently.

What is claimed is:

1. A selective calling receiver comprising receiver section means for receiving and demodulating radio signals, decoder section means coupled to said receiver section, said decoder means operating with a first level of power consumption and with a second level of power consumption which is larger than said first level of current consumption for selectively receiving the demodulated signals and for controlling the receiving operation, power source means, and voltage converter section means for converting the output of said power source means to supply power to said decoder section, first means for making said voltage converter section means non-operating responsive to a signal from said decoder section when operating with said first level of power consumption and for intermittently operating said voltage converting section means when it is operating at said second level of power consumption, power source switch means for turning on and off said power source means, timer means for activating said first means within a predetermined period at the time when said power switch is turned on, and second means between said voltage converting section means and said decoder section means for smoothing the output from said voltage converting section means.

2. The selective calling receiver as claimed in claim 1, and present circuit means for initializing said decoder section means in response to the outputs of said timer means and said second means at the time when said power switch is turned on and continuing until the time when said prescribed period has expired.

3. The selective calling receiver as claimed in claim 1 or 2, wherein said second means comprises a diode connected between the output of said voltage converting section means and a power source terminal of said decoder means and a capacitor connected to said power source terminal of said decoder.

4. The selective calling receiver as claimed in claim 1 or 2, wherein said voltage converting section means comprises a DC-DC converter means.

5. A receiver comprising decoding means selectively operating at either a relatively low power consumption level or at a relatively high power consumption level; power source means; voltage converter means for converting the output of said power source means to supply power to said decoding means; first means for disabling said voltage converter means in response to a signal from said decoding means when said decoding means operates at said relatively low power consumption level and for making said voltage converter means intermittently operative when said decoding means operates at said relatively high power consumption level; means for smoothing the output of said voltage converter means; and timer means responsive to said decoding means for activating said first means for the duration of a measured period of time.

* * * * *

UNITED STATES PATENT AND TRADEMARK OFFICE
CERTIFICATE OF CORRECTION

PATENT NO. : 4,340,973
DATED : July 20, 1982
INVENTOR(S) : SHINJIRO UMETSU

It is certified that error appears in the above—identified patent and that said Letters Patent is hereby corrected as shown below:

Col. 1, Line 58, insert --within a predetermined period-- after "level".

Col. 3, Line 41, insert --),-- after "4(a)".

Col. 5, Line 5, "switches" should be --becomes--;

Col. 5, Line 6, "becomes" should be --switches--;

Col. 5, Line 9, "understand" should be --understood--;

Col. 5, Line 29, delete "as";

Col. 5, Line 53, insert a comma --,-- after "(a)".

Signed and Sealed this

Seventh Day of December 1982

[SEAL]

Attest:

GERALD J. MOSSINGHOFF

Attesting Officer — Commissioner of Patents and Trademarks